(12) United States Patent
Chakraborty et al.

(10) Patent No.: US 12,306,828 B1
(45) Date of Patent: May 20, 2025

(54) CONSTRUCTION OF A USER QUESTIONS REPOSITORY FOR STRUCTURED DATA QUERIES FROM NATURAL LANGUAGE QUESTIONS USING A LARGE LANGUAGE MODEL

(71) Applicant: NICE LTD., Ra'anana (IL)

(72) Inventors: Uttam Chakraborty, Pune (IN); Prasad Mhatre, Pune (IN); Praneet Nadkar, Pune (IN); Karthik Chandrashekaran, Pune (IN)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 18/657,272

(22) Filed: May 7, 2024

(51) Int. Cl.
  *G06F 7/00* (2006.01)
  *G06F 16/21* (2019.01)
  *G06F 16/242* (2019.01)
  *G06F 16/248* (2019.01)

(52) U.S. Cl.
  CPC .......... *G06F 16/243* (2019.01); *G06F 16/212* (2019.01); *G06F 16/248* (2019.01)

(58) Field of Classification Search
  CPC .... G06F 16/243; G06F 16/212; G06F 16/248; G06F 16/2455; G06F 16/24575; G06F 16/90332; G06F 16/285; G06F 16/632; G06F 16/24522; G06F 16/3329; G06F 16/3344; G06F 16/3347; G06F 40/30; G06F 40/35; G06F 40/279; G06F 40/56; G06F 40/284; G06F 21/6227
  See application file for complete search history.

(56) References Cited

U.S. PATENT DOCUMENTS

| | | | |
|---|---|---|---|
| 12,254,029 B1 * | 3/2025 | Veillon | G06F 16/248 |
| 2024/0265041 A1 * | 8/2024 | Rennie | G06F 16/248 |
| 2024/0330796 A1 * | 10/2024 | Pandey | G06F 40/279 |
| 2025/0021547 A1 * | 1/2025 | Lewis | G06F 16/2455 |
| 2025/0022200 A1 * | 1/2025 | Huang | G10L 13/047 |

\* cited by examiner

*Primary Examiner* — Mohammad A Sana
(74) *Attorney, Agent, or Firm* — Haynes and Boone, LLP

(57) ABSTRACT

A data query system and methods are provided that are configured to intelligently generate structured data queries from natural language questions using large language models (LLMs). The system includes a processor and a computer readable medium operably coupled thereto, the computer readable medium comprising a plurality of instructions stored in association therewith that are accessible to, and executable by, the processor, to perform operations which include receiving a natural language question for structured data, converting the natural language question to embeddings, matching the embeddings to pre-generated questions from a user questions repository (UQR), determining an accuracy of the matching meets or exceeds a threshold similarity, determining, using an LLM and metadata corresponding to the pre-generated questions from the UQR, a structured data query for querying for the structured data, and querying the structured database system using the structured data query.

20 Claims, 9 Drawing Sheets

CONSTRUCTION OF A USER QUESTIONS REPOSITORY FOR STRUCTURED DATA QUERIES FROM NATURAL LANGUAGE QUESTIONS USING A LARGE LANGUAGE MODEL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to large language models (LLMs) and other artificial intelligence (AI) systems and models, and more specifically to a system and method for automatically generating structured data queries from natural language questions by prompting an LLM based on corresponding pre-generated questions and metadata.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

With the advent of LLMs, service providers may utilize LLMs to provide a "talk to your data"-type service for data querying and searching by users, which has gained popularity for simplified data retrieval. This service seeks to allow users to directly interact with their data and databases, questioning LLMs to provide answers based on knowledge of that data. However, when considering the specific case of "talking to your structured database in natural language," where LLMs may be conversing with users in natural language but data may be stored in a structured format, several issues may arise from the differences in structure, syntax, and semantics between such natural language and structured query language (SQL) or other structured data languages. As such, LLMs may not be capable of directly using natural language questions for structured data querying. For example, the service provider and LLM may need to determine which user questions can be processed and served for certain structured data and databases. LLMs may be conventionally trained on Internet data and/or trained to be general-purpose, therefore, in the context of enterprise software and structured data, such general-purpose LLMs are insufficient to retrieve and/or provide accurate answers to questions.

As such, service providers utilizing LLMs to converse with and/or search structured data may need to ensure that the question asked by the end user are relevant to certain structured data and therefore the structured data can answer such questions, as well as if the questions can or should be answered from the structured data. For example, when asking an LLM a question, such as "Who are my best agents based on average wait time?" or "Which are the best movies based on average viewer ratings?", the LLM may also be required to determine if the LLM can and/or should search for the data and serve the data to the user. The service provider may be required to determine, for the task of asking the LLM to convert a natural language question to an SQL query, whether and how to share the data view's or table's definitions. As such, if there are many columns in a structured data table, an LLM may not provide the best response, or if there are many different data views and/or tables, the LLM may not be able to or may not be capable of performing optimal data joins, and therefore may perform suboptimally when serving data.

Even when all the data can be served, an LLM may not best infer which views or tables from the entire set are the most relevant for the question at hand. As such, while semantic searching may work well for LLMs when searching text, LLMs face significant challenges when users ask questions against structured data stored in tables and columns. Unlike text content, narrowing down relevant information for natural language questions in this context is difficult. As such, it is desirable to provide LLMs a process for searching natural language questions on structured datastores and corresponding data using structured data queries. Therefore, there is a need for an automated, intelligent, and efficient computing system and framework that can provide natural language input conversion to structured query languages for more accurate and efficient data querying of structured databases and other structured data storage systems.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

Figure 1:
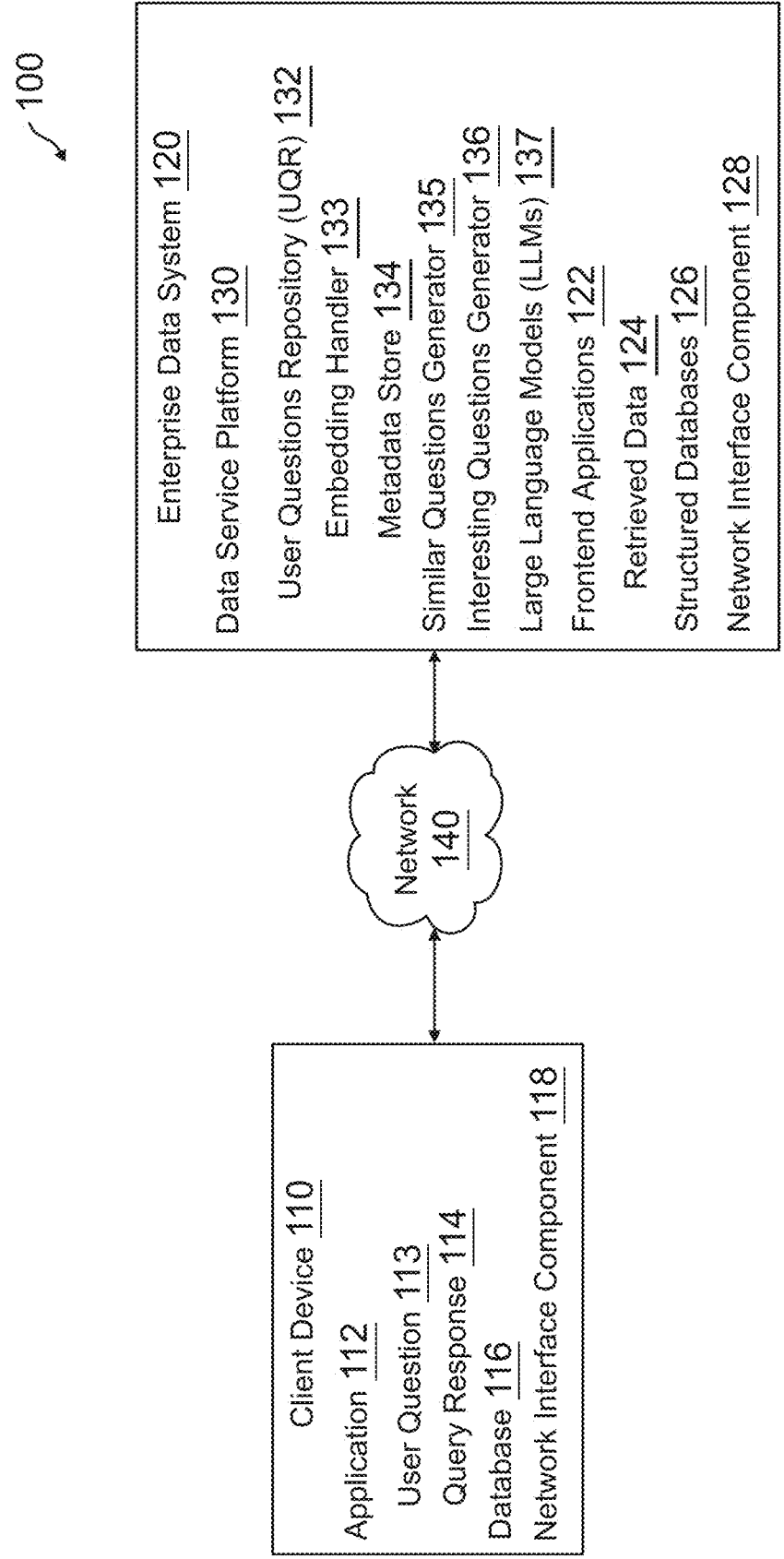
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

A service provider may provide a user questions repository (UQR), which may be utilized for applications that respond to user questions in natural language that are queried and/or searched against a structured database or other data storage system. The UQR may be application, tenant, and/or role/persona specific, and may provide relevant metadata for responding to users corresponding to that application, tenant, and/or role/persona that question an LLM for data from a structured database. When responding to questions, the UQR may determine whether it is possible to respond to an input user question using a structured database, such as whether the question to be run against the structured database may provide a response or result from querying such database. A feedback loop may trigger an automation having a human-in-the-loop cycle that updates the UQR, where human intervention may be provided for UQR updating when needed. The UQR may solve the problem of converting a natural language question to a structured query to be run against a structured database by sending relevant context of the question enriched with relevant metadata to an LLM for query generation. When sending such data, prompting strategies may be used, such as a retrieval augmented generation (RAG)-based prompting and questioning process, for more relevant and optimized outputs (e.g., by using authoritative knowledge outside of the LLM's training and/or original searchable data sources before generating a response to a question).

As such, the UQR may send a fixed set of data and/or prompt information to the LLM, which may include data view definitions. For example, although context window sizes for LLMs are increasing, providing many definitions to the LLM and expecting the LLM to infer correctly may be counterintuitive because prompting and searching for structured data is not free text and/or natural language interpretation. With the UQR, once there is a match between the question and a known or previously generated question in the UQR, the service provider may provide the most relevant view definitions, rules, SQL query examples, and other relevant metadata for the question to the LLM. As such, using the UQR, the service provider may determine which explicit rules to attach at the individual question level to guide the LLM in generating the most accurate SQL query needed to serve the natural language question asked by the end user.

Matching may be performed by converting the natural language question received to embeddings. Once converted, those embeddings may be compared to existing embeddings for user defined questions and/or other pre-generated questions, such as similar questions and interesting questions previously generated using an LLM or other generative AI. Similar questions may be questions that are related to an input question, such as by having the same subject matter, but may ask the question in a different manner and/or seek different answers from the subject matter and/or knowledge of the subject matter. Interesting questions may be questions that are "interesting" or questions of relevance to a set of schema definitions for data views, data tables, or the like for a corresponding structured data set and/or database. As such, interesting questions may be those of relevance to the structured data and manner in which the structured data is stored and/or referenced, where the structured data is to be queried and/or searched from the input question and/or question's information or prompt definitions. Comparison may be done through vector comparison and/or matching, such as using similarity scores including cosine similarity between two vectors and/or Euclidean distance between different points. As such, if certain similarity scores meet or exceed a threshold similarity and/or score, such as by assessing an accuracy of the matching through threshold requirements, then the pre-generated questions and/or corresponding metadata may be fetched from the UQR for prompting the LLM to generate a structured query.

Using the metadata, embeddings, and/or the original natural language question, a structured query may be generated. The structured query may be generated by prompting a generative AI service including an LLM or the like to provide the structured query in response to a prompt. The prompt may include instructions to create a structured query from the aforementioned data, where the LLM may be trained and/or have a knowledge basis associated with structured querying of structured databases, database systems, and/or in structured query languages (e.g., SQL). For example, the Azure OpenAI Service or similar generative AI and/or LLM service may be prompted using the aforementioned data. The prompting may be based on the users/organization configuration preferences and structured data systems so that responses may be generated in the desired format for the structured data. This query may then be output and/or executed on the structured database(s) and/or systems to return data as a response to the user's original natural language question.

As such, an intelligent system according to the present disclosure is provided to solve various issues with manual generation of structured queries in a structured query language, which may be unfamiliar, time consuming, and/or unintuitive to users when compared to natural language. This may be done using GPT-4 or other generative pre-trained transformers (GPTs), LLMs, or the like, to provide conversational and/or generative AI. For example, an LLM may provide natural language processing to analyze and understand large amounts of textual data and provide human-like responses and information. By leveraging LLMs, generative AI services may provide natural language processing capabilities, allowing prompting for responses that analyze and interpret large amounts of data with accuracy and speed, thereby summarizing data and generating responsive and helpful answers for questions. LLMs and other generative AI may learn on past data use when providing structured query generation, such as which queries were successful or not in returning the proper structured data to natural language questions.

A computing service and framework may be coded, deployed, and made available to users that automatically generates structured queries from natural language questions using LLMs, GPTs (e.g., GPT-4), or the like. The embodiments described herein provide methods, computer program products, and computer database systems for a machine learning (ML) or other AI system that programmatically processes, evaluates, and responds to natural language questions with structured queries and/or structured data from structured querying, as described herein. The framework of intelligent automation for query generation may therefore provide data searching and retrieval operations in a faster, more efficient, and more convenient manner, providing intuitive questioning using natural language in place on more obscure and technical query languages. This provides an improved data searching, storage, and retrieval system with better compatibility and more convenient and efficient searching.

According to some embodiments, in an ML system accessible by a plurality of separate and distinct organizations, ML algorithms, features, and models are provided of a data query system for providing structured queries and/or structured query searching from natural language questions intelligently and automatically, thereby providing faster, more efficient, and more precise query generation and/or data retrieval operations.

Example System and Computing Environment

The system and methods of the present disclosure can include, incorporate, or operate in conjunction with, or in the environment of, an ML engine, model, and intelligent system, which may include an ML or other AI computing architecture that provides structured query generation and/or searching for natural language input including questions from users. Such structured query generation and/or searching may be performed using LLMs by prompting using metadata from a UQR. FIG. 1 is a block diagram of a networked environment 100 suitable for implementing the processes described herein according to an embodiment. As shown, environment 100 may include or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or lesser number of devices and/or servers. For example, ML models, NNs, and other AI architectures have been developed to improve predictive analysis and classifications by systems in a manner similar to human decision-making, which increases efficiency and speed in performing predictive analysis on datasets requiring machine predictions, classifications, and/or analysis. One or more devices and/or servers may be operated and/or maintained by the same or different entities.

FIG. 1 illustrates a block diagram of an example environment 100 according to some embodiments. Environment 100 may include a client device 110 and an enterprise data system 120 that interact over a network 140 to provide intelligent querying of structured databases and data storage systems using natural language questions from users through structured query generation and/or execution, as discussed herein. In other embodiments, environment 100 may not have all of the components listed and/or may have other elements instead of, or in addition to, those listed above. In some embodiments, environment 100 is an environment in which a data service platform 130 may perform data searches and/or retrieval from structured databases 126 using structured queries, where such queries may be generated from user submitted questions using LLMs 137. As illustrated in FIG. 1, enterprise data system 120 might interact via a network 140 with client device 110 to provide data searching and retrieval services through data service platform 130, which may include "talk to your data"-type services (e.g., data searching, querying, retrieval, and/or use) for natural language questions, statements, and other submissions and inputs.

For example, in enterprise data system 120, frontend applications 122 may provide and/or process data from data storage components and systems, including structured databases 126. As such, frontend applications 122 may consume and/or output data that results from structured data searching and querying of structured databases 126. To do so, data service platform 130 may provide operations to allow for natural language questions and other inputs to be used in place of structured data queries in a particular query language, such as SQL and the like. Instead, data service platform 130 may convert natural language inputs to structured queries by generating queries using a UQR 132 having a data set of pre-generated user questions including past questions and/or procedurally generated questions. An embedding handler 133 may be used to generate embeddings from pre-generated and/or user questions. These embeddings may correspond to vectors or other mathematical representations of one or more words in a question or other natural language input, and may be used to compare and match, procedurally using a similarity comparison operation (e.g., cosine similarity, Euclidean distance, etc.), embeddings and therefore their corresponding questions.

Embedding handler 133 may therefore be used to create pre-generated embeddings for pre-generated questions. The embeddings may be stored by UQR 132 for matching to embeddings from received input, which allows for retrieval of metadata from metadata store 134 for structured query generation. As such, structured queries may be generated using embedding handler 133 with metadata store 134 by prompting and/or requesting that one or more LLMs 137 generate such queries. These questions may be previously processed to have corresponding metadata in metadata store 134 that may be used for structured query generation, such as metadata indicating, for the questions, a relevant data view definition, a relevant rule, a relevant example, a relevant data table, a relevant data source name to connect to, or user-friendly explanations of columns of importance determined by a user in the relevant data view definition or the relevant data table. Metadata store 134 may be used for structured query generation by defining the parameters, limits, data sources, and the like for querying structured databases 126 and/or data searching.

To create the pre-generated questions procedurally in place of using past submissions, a similar questions generator (SQG) 135 and an interesting questions generator (IQG) 136 may be used. SQG 135 may generate questions procedurally based on given user inputs, such as previous questions by users and/or input questions from an initial system configuration by a user (e.g., administrator, data scientist, etc.). These input questions may therefore correspond to prompt questions for similar question generation using one or more of LLMs 137 for intelligent generation automatically. IQG 136 may be used to generate questions of relevance to a structured data set and/or database procedurally from a set of schema definitions for a particular set of structured data and the like. LLMs 137 may similarly be used to generate such questions using the schema definitions. These questions may then be associated with their metadata from question generation, and UQR 132 may store the questions, metadata, and/or embeddings from the questions for use and retrieval during structured query generation.

Thereafter, when a natural language question or other input is received, UQR 132 may be used with LLMs 137 for data retrieval. For example, application 112 on client device 110 may be used to submit a user question 113 to one of frontend applications 122. User question 113 may correspond to a natural language question or other input, which may therefore be required to be processed to perform structured querying of structured databases 126 for the data requested by user question 113. Frontend applications 122 may be integrated with and/or capable of calling (e.g., using one or more application programming interface (API) calls) data service platform 130 for data querying and retrieval. As such, data service platform 130 may utilize UQR 132 with LLMs 137 to generate structured queries, as discussed herein. These queries may be executed on structured databases 126, which may return retrieved data 124 for user question 113. Thereafter, a query response 114 may be output in application 112 based on retrieved data 124. Thus, enterprise data system 120 may be utilized to provide ML operations to tenants, customers, and other users or entities via frontend applications 122 for data retrieval from structured databases 126 using natural language inputs. The operations to generate structured queries by prompting an LLM are discussed in more detail with regard to FIGS. 2-7 below.

Data service platform 130 may leverage generative AIs, LLMs, GPTs including GPT-4, or other models to integrate such models for generative AI services. Data service platform 130 may not rigidly specify a specific generative AI model, permitting generative AI models, LLMs, GPTs, or the like to be modularly added or removed based on changes and advancements. Further, data service platform 130 may not be restricted to calling generative AI services and LLMs once or a limited number of times, and queries and/or responses from natural language inputs may be generated piece-by-piece or by providing examples, although single calls may be preferred in certain embodiments. For LLMs 137 and other ML models (e.g., decision trees and corresponding branches, NNs, clustering operations, etc.) including those used by data service platform 130, the models may be trained using training data, which may correspond to stored, preprocessed, and/or feature transformed data associated with pre-generated questions, metadata, queries, query responses, or the like, as well as other conversational skills. With continuous and/or reinforcement training, live streaming data from one or more production, live, and/or real-time computing environments may be used, as well as feedback from different entities. Model training and configuring may include performing feature engineering and/or selection of features or variables used by ML models. Features or variables may correspond to discreet, measurable, and/or identifiable properties or characteristics.

LLMs, ML modes, and NNs used by enterprise data system 120 may be trained using one or more ML algorithms, operations, or the like for modeling (e.g., including configuring decision trees or neural networks, weights, activation functions, input/hidden/output layers, and the like). Thus, one or more ML models, NNs, or other AI-based models and/or engines may be trained for structured query generation and/or execution from natural language questions and other inputs, or another ML task. The training data may be labeled or unlabeled for different supervised or unsupervised ML and NN training algorithms, techniques, and/or systems. Enterprise data system 120 may further use features from such data for training, where the system may perform feature engineering and/or selection of features used for training and decision-making by one or more ML, NN, or other AI algorithms, operations, or the like (e.g., including configuring decision trees, weights, activation functions, input/hidden/output layers, and the like). A model may then be trained using a model training function and/or algorithm for the model trainer. The training may include adjustment of weights, activation functions, node values, and the like. After initial training of models, models may be evaluated and/or released in a production computing environment. For example, LLMs may be used to provide conversational AI skills and performance, which may utilize training and a knowledge base to respond to queries and other prompts from users.

One or more client devices and/or servers (e.g., client device 110 using application 132) may execute a web-based client that accesses a web-based application for enterprise data system 120, or may utilize a rich client, such as a dedicated resident application, to access enterprise data system 120, which may be provided by frontend applications 122 to such client devices and/or servers. Client device 110 and/or other devices or servers may utilize one or more application programming interfaces (APIs) to access and interface with frontend applications 122 and/or data service platform 130 of enterprise data system 120 in order to access, review, and evaluate question and query responses, as discussed herein. Interfacing with enterprise data system 120 may be provided through frontend applications 122 and/or data service platform 130, which may be based on data stored by structured databases 126 of enterprise data system 120 and/or a database 116 of client device 110.

Client device 110, enterprise data system 120, and/or other devices and servers on network 140 might communicate using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between client device 110 and enterprise data system 120 may occur over network 140 using a network interface component 118 of client device 110 and a network interface component 128 of enterprise data system 120 and corresponding interfaces, connections, and the like. In an example where HTTP/HTTPS is used, client device 110 might include an HTTP/HTTPS client for application 112, commonly referred to as a "browser," for sending and receiving HTTP//HTTPS messages to and from an HTTP//HTTPS server, such as enterprise data system 120 via the network interface component.

Similarly, enterprise data system 120 may host an online platform accessible over network 140 that communicates information to and receives information from client device 110. Such an HTTP/HTTPS server might be implemented as the sole network interface between client device 110 and enterprise data system 120, but other techniques might be used as well or instead. In some implementations, the interface between client device 110 and enterprise data system 120 includes load sharing functionality. As discussed above, embodiments are suitable for use with the Internet, which refers to a specific global internet of networks. However, it should be understood that other networks can be used instead of or in addition to the Internet, such as an intranet, an extranet, a virtual private network (VPN), a non-TCP/IP based network, any LAN or WAN, or the like.

Client device 110 and other components in environment 100 may utilize network 140 to communicate with enterprise data system 120 and/or other devices and servers, and vice versa, which is any network or combination of networks of devices that communicate with one another. For example, network 140 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet, network 140 may correspond to such a network using the TCP/IP protocol for data transfer. However, it should be understood that the networks that the present embodiments might use are not so limited, although TCP/IP is a frequently implemented protocol. Further, one or more of client device 110 and/or enterprise data system 120 may be included as part of the same system, server, and/or device and therefore communicate directly or over an internal network.

According to one embodiment, enterprise data system 120 is configured to provide webpages, forms, applications, data, and media content to one or more client devices and/or to receive data from client device 110 and/or other devices, servers, and online resources. In some embodiments, enterprise data system 120 may be provided or implemented in a cloud environment, which may be accessible through one or more APIs with or without a corresponding graphical user interface (GUI) output. Enterprise data system 120 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, client device 110, shown in FIG. 1, executes processing logic with processing components to provide data used for frontend applications 122 and/or data service platform 130 of enterprise data system 120, such as during structured data querying of structured databases 126. In one embodiment, client device 110 includes application servers configured to implement and execute software applications as well as provide related data, code, forms, webpages, platform components or restrictions, and other information, and to store to, and retrieve from, a database system related data, objects, and web page content. For example, enterprise data system 120 may implement various functions of processing logic and processing components, and the processing space for executing system processes, such as running applications. Client device 110 and enterprise data system 120 may be accessible over network 140. Thus, enterprise data system 120 may send and receive data to client device 110 via network interface components 128 and 118, respectively. Client device 110 may be provided by or through one or more cloud processing platforms, such as Amazon Web Services® (AWS) Cloud Computing Services, Google Cloud Platform®, Microsoft Azure® Cloud Platform, and the like, or may correspond to computing infrastructure of an entity, such as a financial institution.

Several elements in the system shown and described in FIG. 1 include elements that are explained briefly here. For example, client device 110 could include a desktop personal computer, workstation, laptop, notepad computer, PDA, cell phone, or any wireless access protocol (WAP) enabled device or any other computing device capable of interfacing directly or indirectly to the Internet or other network connection. Client device 110 may also be a server or other online processing entity that provides functionalities and processing to other client devices or programs, such as online processing entities that provide services to a plurality of disparate clients. Client device 110 may run an HTTP/HTTPS client, e.g., a browsing program, such as Microsoft's Internet Explorer or Edge browser, Mozilla's Firefox browser, Opera's browser, or a WAP-enabled browser in the case of a cell phone, tablet, notepad computer, PDA or other wireless device, or the like. According to one embodiment, client device 110 and all of its components are configurable using applications, such as a browser, including computer code run using a central processing unit such as an Intel Pentium® processor or the like. However, client device 110 may instead correspond to a server configured to communicate with one or more client programs or devices, similar to a server corresponding to enterprise data system 120 that provides one or more APIs for interaction with client device 110.

Thus, client device 110 and/or enterprise data system 120 and all of their components might be operator configurable using application(s) including computer code to run using a central processing unit, which may include an Intel Pentium® processor or the like, and/or multiple processor units. A server for client device 110 and/or enterprise data system 120 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring client device 110 and enterprise data system 120 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Structured Data Query System

Figure 2:
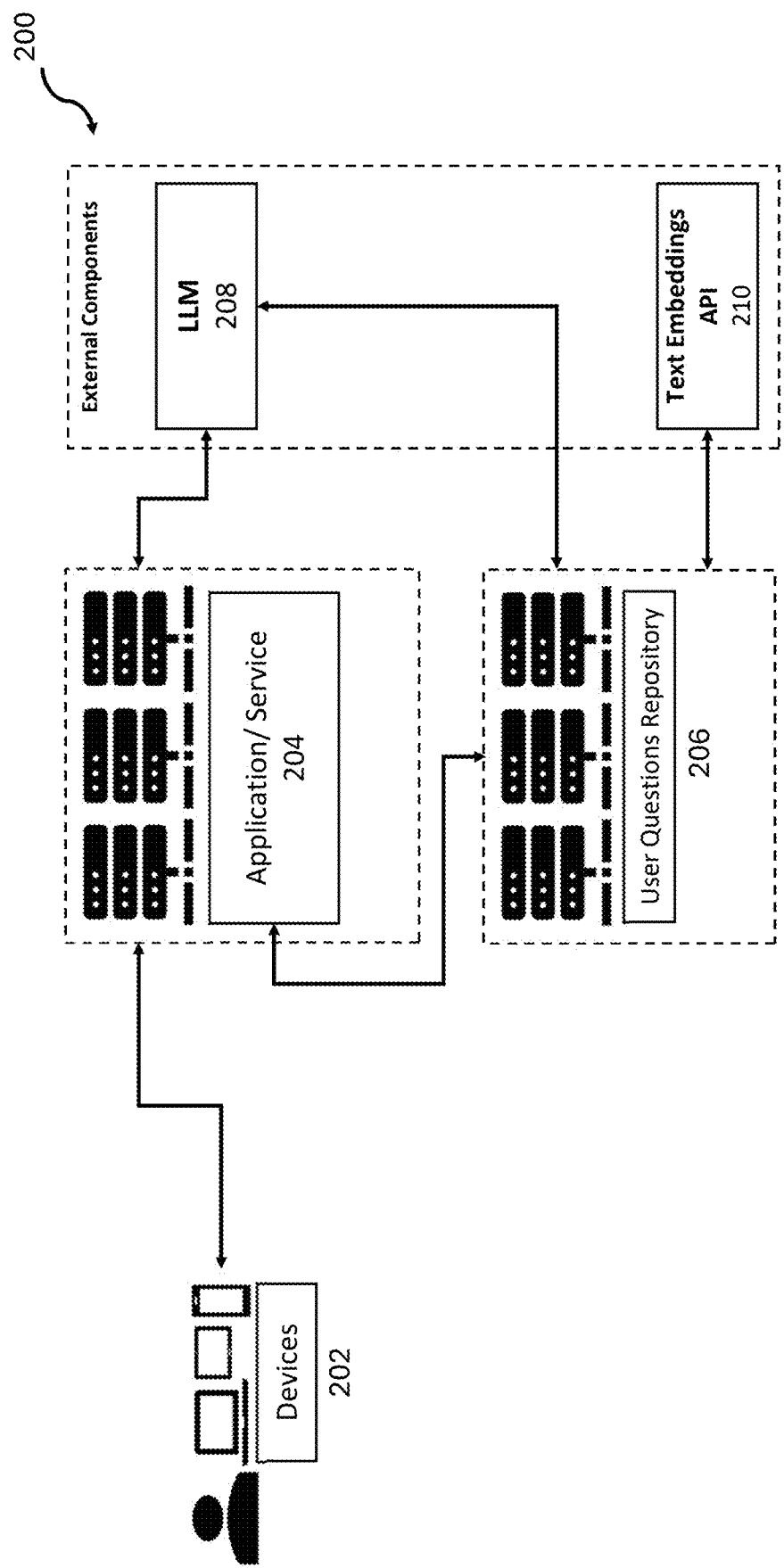
FIG. 2 is a simplified system architecture of a data query system that may generate structured queries for structured databases using pre-generated questions and metadata from a user questions repository (UQR) with an LLM according to some embodiments.

FIG. 2 is a simplified system architecture 200 of a data query system that may generate structured queries for structured databases using pre-generated questions and metadata from a UQR with an LLM according to some embodiments. System architecture 200 of FIG. 2 includes a representation of the components utilized for structured data querying on structured databases from natural language questions and other inputs, which may be performed by enterprise data system 120 using data service platform 130 discussed in reference to environment 100 of FIG. 1. In this regard, system architecture 200 displays the components that interact when generating structured data queries using metadata from pre-generated questions and embeddings.

In this regard, user devices 202 may interact with an application/service 204 to submit questions, requests, and other inputs to be queried on structured data stored by a structured database or other structured data storage system. These inputs may be provided in a natural language format, such as standard English or other language text and writing. As such, application/service 204 may correspond to any such software application and/or computing service that is required to convert natural language to SQL or other structured data language for querying on structured databases (e.g., databases or other data storage systems storing structured data in data tables and views including columns and rows that are searchable using structured data queries in a specific format). This may be done through query translation, which may utilize a UQR 206 with an LLM 208 and/or text embedding API 210 for converting the natural language questions and other inputs to structured queries.

Thus, UQR 206 may be utilized by application/service 204 to provide data for converting natural language inputs to the corresponding format and syntax of SQL or other structured data language. Application/service 204 and UQR 206 may be deployed in any platform including cloud computing platforms and providers, on-premises applications/services, hybrid type deployments, and the like. Likewise, UQR 206 may be deployed with application/service 204 or callable by application/service 204 from another application or endpoint via one or more API calls exchanged between corresponding APIs. UQR 206 may store the pre-generated questions and embeddings for those questions used to resolve user questions and other inputs in natural language through matching and/or comparison, such as cosine similarity or other assessment of an accuracy of matching between vectors for embeddings. Conversion of natural language for user inputs and/or pre-generated questions may be done by calling text embeddings API 210. UQR 206 may further be integrated with LLM 208 to call and prompt LLM 208 for query generation using metadata for pre-generated questions available from UQR 206.

LLM 208 may be provided and/or utilized by application/service 204 for responding to user questions in a more optimized manner for user generated questions in natural language. LLM 208 may provide generative AI capabilities as part of an internal or external component for application/service 204 and its corresponding service provider. Example, Azure Open AI with GPT-4 or GPT-35-Turbo-16k may be used, although other LLMs may also be trained and used, as described herein. Text embedding API 210 may be used as an embedding API solution for generating embeddings from natural language text, such as questions. As such, text embedding API 210 may provide capabilities to convert a piece of text to embeddings i.e., an ordered sequence of numbers using an embeddings AI (e.g., a neural network (NN) or machine learning (ML) model). These components and their operations of system architecture 200 in FIG. 2 is further described below with regard to FIGS. 3-7.

Figure 3:
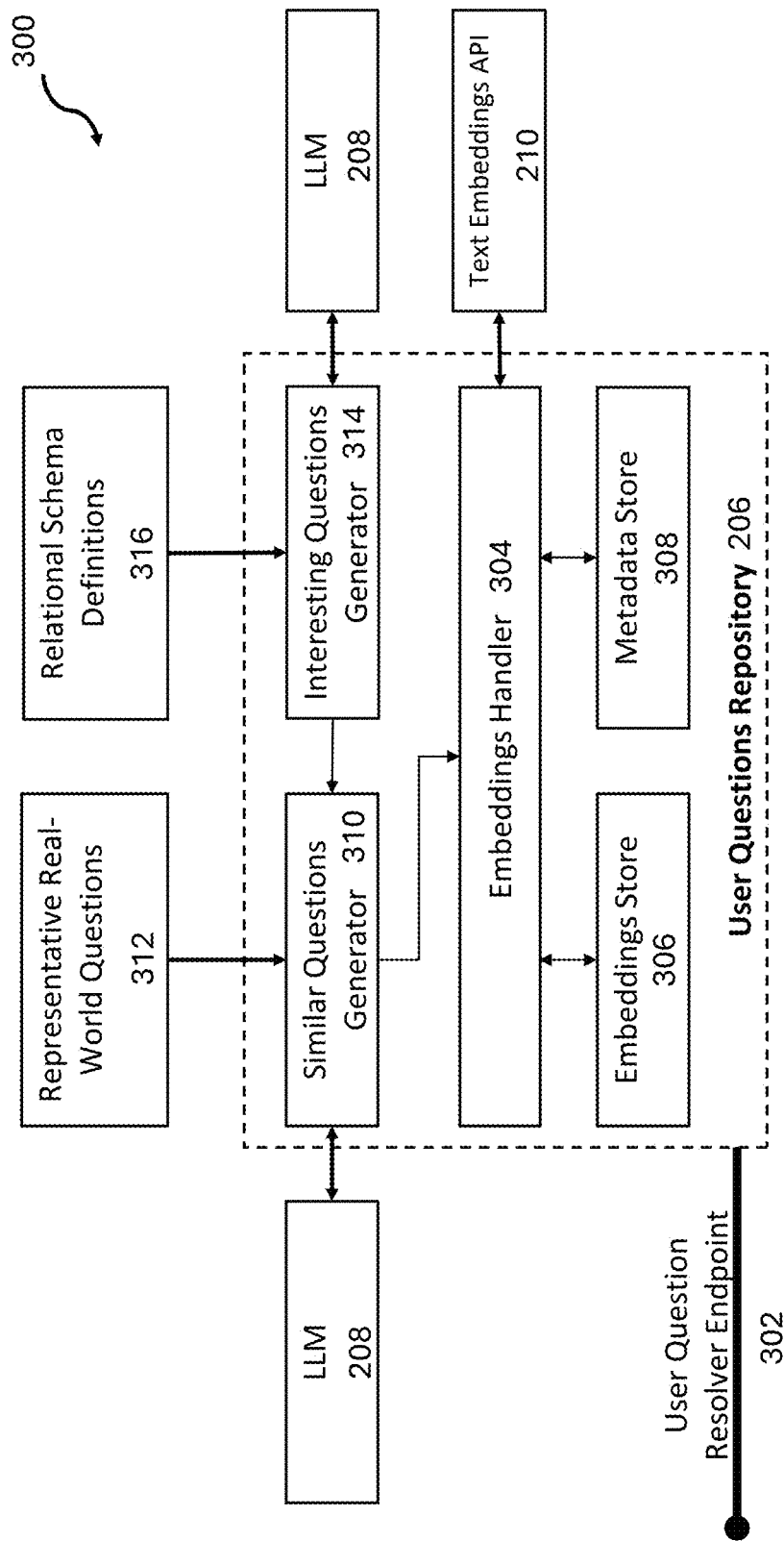
FIG. 3 is a simplified diagram for resolving user questions in natural language on structured databases using a UQR and LLM for structured query generation according to some embodiments.

FIG. 3 is a simplified diagram 300 for resolving user questions in natural language on structured databases using a UQR and LLM for structured query generation according to some embodiments. For example, diagram 300 of FIG. 3 shows UQR 206 in further detail, which may interact with LLM 208 and text embedding API 210 for resolving user questions in natural language for data from structured databases, data stores, and other data storage systems. In this regard, diagram 300 shows a flow of handling a user question from a user question resolver endpoint 302 using metadata corresponding to matched pre-generated questions from corresponding embeddings. In this regard, UQR 206 includes an embeddings handler 304 that may interact with an embeddings store 306, a metadata store 308, an SQG 310, and/or an IQG 314 for structured query generation and/or query execution on one or more structured databases from natural language inputs.

UQR 206 may receive a natural language question or other input and thereafter be required to convert the natural language for the question and/or one or more sub-questions for the question to SQL or other structured data language. As such, UQR 206 may utilize SQG 310 and IQG 314 to pre-generate questions intelligently and procedurally, storing such questions in-application, locally, or to available storage for real-time matching to user submitted questions. This allows for conversion of natural language questions to SQL or other structured data format queries that may be run against a datastore and corresponding data, data tables, and/or data views. Embeddings handler 304 may be used for embedding generation from natural language questions and other input, such as the sentence(s) and/or other text provided by a user. Embeddings handler 304 may correspond to a software program that handles embeddings and metadata. As such, embeddings handler 304 may create embeddings of input text using embeddings API 210, and thereafter attach metadata information to the embeddings for storage by metadata store 308. This may correspond to actual metadata values, as well as a reference/link to where the actual metadata is stored. Embeddings and metadata content may be persisted in embeddings store 306 and metadata store 308, respectively, so that those stores may be queried and matched. The metadata from the results may then be attached to a given input text (e.g., a user submitted question)

SQG 310 may correspond to a software program that generates variations of a given input user question, such as representative real-world questions 312 taken from past questions and/or example questions created by users (e.g., system administrators, data scientists, etc.). SQG 310 may be run in a serverless mode (e.g., AWS Lambda) or run as a dedicated microservice. This may be the same microservice as the other components of UQR 206. SQG 312 may generate the variations of representative real-world questions 312 using LLM 208, embeddings API 210, and configured thresholds. Similarly, IQG 314 may correspond to a software program that generates interesting and possible questions (e.g., questions of relevance) given a logical set of relational schema definitions 316 for a particular set of structured data. IQG 314 also may be run in a serverless mode (e.g., AWS Lambda) or as a dedicated microservice, and may use LLM 208 for generating the interesting and possible questions given the logical set of related schema definitions 316.

Figure 4A:
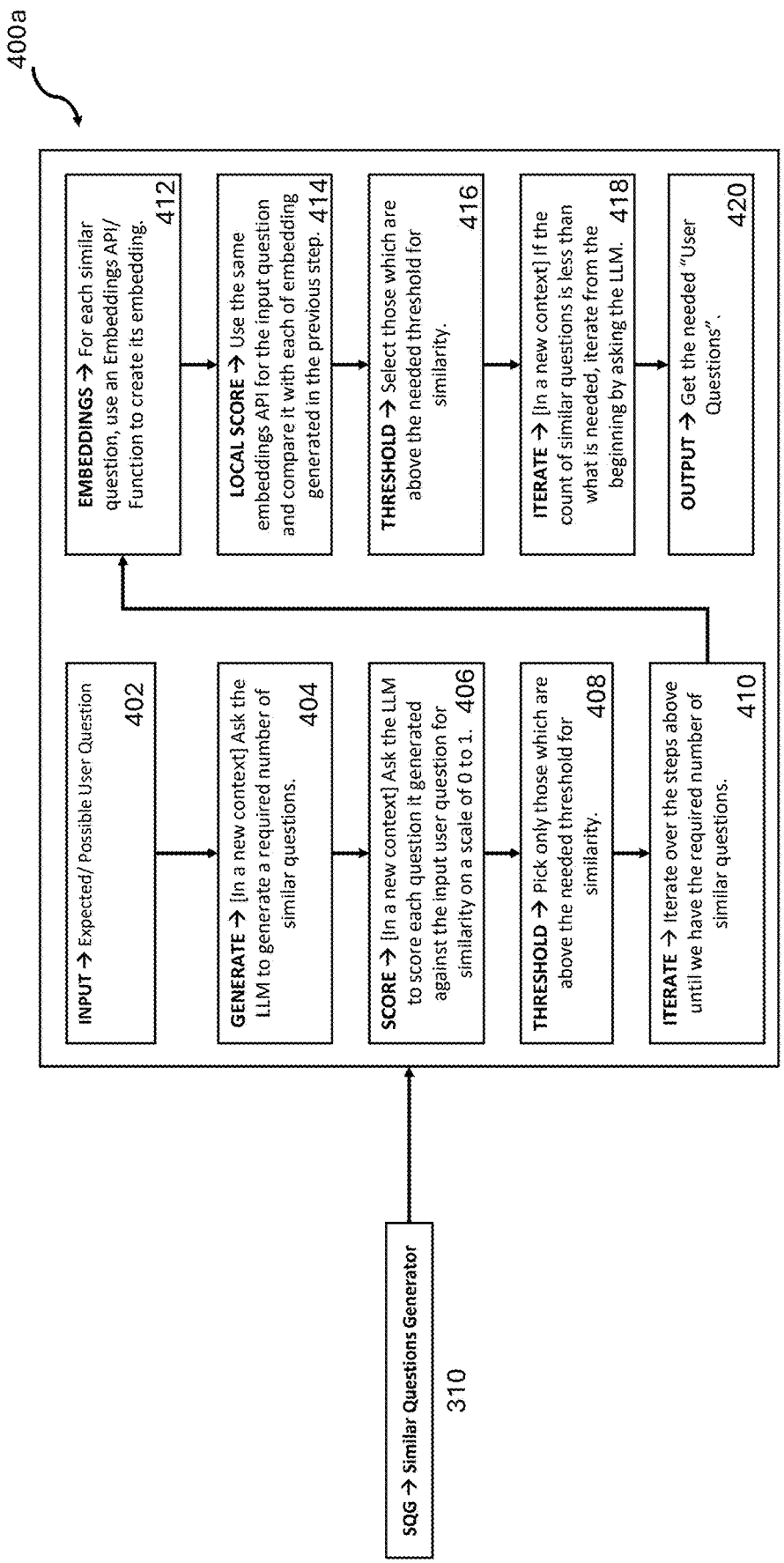
FIGS. 4A and 4B are simplified diagrams of generators for a UQR that provide pre-generated questions with corresponding embeddings and metadata for matching to natural language inputs from users according to some embodiments.
Figure 4B:
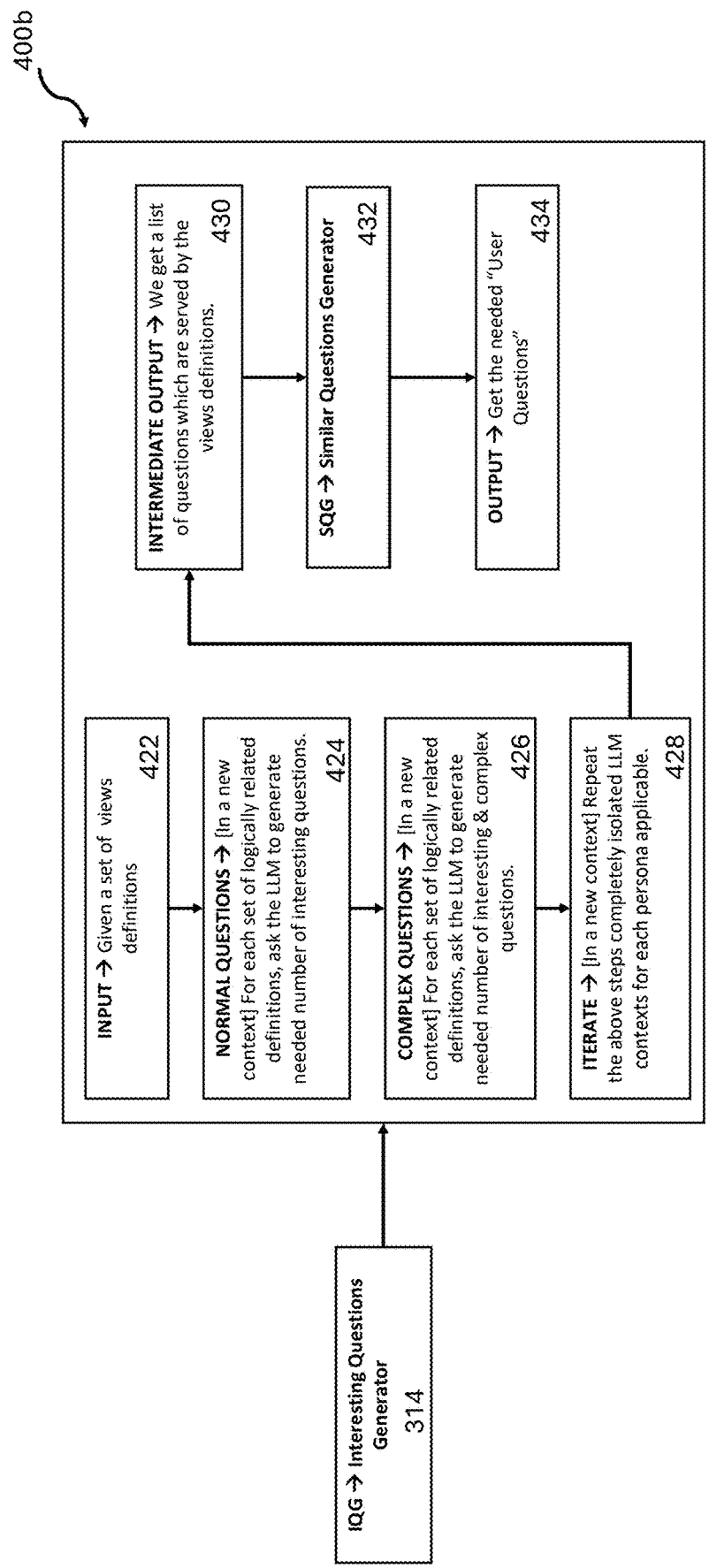

FIGS. 4A and 4B are simplified diagrams 400a and 400b of generators for a UQR that provide pre-generated questions with corresponding embeddings and metadata for matching to natural language inputs from users according to some embodiments. Diagrams 400a and 400b of FIGS. 4A and 4B include tasks, operations, and corresponding steps that may be performed by SQG 310 and IQG 314, respectively, when generating questions intelligently and procedurally using an LLM, such as LLM 208. This may be done by prompting the LLM as shown in diagrams 400a and 400b. Such prompts may be used to generate similar and interesting questions from initial input without manual user efforts such that the questions may be added to UQR 206 with embeddings for later matching during processing of natural language questions on structured database, data sets and/or tables, and other structured data.

Diagram 400a of FIG. 4A shows operations performed by SQG 310 to generate similar questions from initial input questions, which may be taken from user input (e.g., questions provided by a data scientist or other user configuring the pre-generated and stored questions for UQR) and/or from past question submissions by users. In this regard, at step 402, an input is received of expected and/or possible user questions, such as those that have been provided from user input and/or past question submissions. SQG 310 may correspond to a software program that generates many variations of a given input end-user question using the LLM, the embeddings API, and configured thresholds. At step 404, the LLM is prompted to generate multiple variations of the given question. The prompt itself can change depending on the persona, the vertical/domain corresponding to the question, and the like. In this regard, the LLM may be specifically prompted to generate as many questions as needed and/or within a certain similarity score to the initial input question, which may be computed by comparing embeddings of the words and/or phrases of the input question and similarly generated questions.

At step 406, each question that was generated is scored in a new context and/or prompt to the LLM. The scoring may be based on a scale of 0 to 1, with 0 being entirely different and 1 being the same. The LLM may utilize a variety of comparison and similarity scoring including cosine similarity and the like through embeddings and embeddings comparisons. However, other similarity and/or clustering algorithms and techniques may be used by the LLM to assess similarity and/or cluster those sentences with sufficient accuracy of matching and/or similarity with the main question initially proposed. At step 408, a threshold is applied, which may be fixed or dynamic depending on the task and system configurations. As such, those sentences meeting or exceeding a certain similarity may be added to a "short list" for processing. At step 410, this process is iterated over other questions until a sufficient number of similar questions have been generated.

At step 412, once the list of similar questions and scores are generated from the LLM, embeddings of those questions may be generated using an embeddings API. These may be stored and/or referenced, however, not all embeddings may be required to be generated at once and those embeddings generated may depend on how many embeddings are being handled at a given time. At step 414, the embeddings are further scored in relation to the input question's embeddings and the embeddings of the other questions. This may be done without the LLM and using an internal scoring algorithm and/or technique, such that different scoring mechanisms may be used and. Depending on the use case, the algorithm and scoring can be chosen differently. As such, with the UQR, the LLM may be used for similarity matching only after a match has been found locally based on the internal scoring using the embeddings from step 414. At step 416, a threshold may be applied again and those questions having embeddings meeting or exceeding a threshold may be short-listed for comparisons. This is iterated over for all questions and contexts at step 418 so that if the count of similar questions is insufficient, steps 402-416 may repeat. Thereafter at step 420, an output of similar pre-generated questions and their pre-generated embeddings may be provided and persisted in an embeddings store or other vector database.

Diagram 400b of FIG. 4B shows operations performed by IQG 314 to generate interesting questions from an initial input of a set of database views and/or other schema definitions for a set of structured data and/or structured database or other storage system. These schema definitions may be taken from the metadata and/or views, tables, structures, definitions, and the like so that interesting and possible questions may be generated given a logical set of related schema definitions. IQG 314 may similarly correspond to a software program executable to perform these operations. In this regard, at step 422, the schema definitions may be provided as input into smaller logical sets and sent to the LLM. At step 424, the LLM is then prompted to generate normal or standard questions from which the LLM intelligently predicts can be served and processed on the structured data having the schema definitions.

At step 426, the LLM is further prompted to generate complex questions which can be served by the schema definitions. The complex questions may correspond to those questions and/or cases where complex data join and/or filter operations or query clauses may be required when processing corresponding structured queries on the structured data. This prompting may be performed by providing examples of complex structured queries in relation to the schema definitions provided. At step 428, a list of interesting questions may then be output and provided by the LLM for IQG 314, and, at step 430, the process is iterated over for each persona asking the questions and/or the structured data requested by the persona(s). Once sufficient interesting questions for the persona(s) potentially submitting questions have been generated, at step 432, the interesting questions are input to SQG 310, which may proceed to process as discussed above with regard to diagram 400*a* (e.g., starting at step 402). The resulting output of interesting questions and their similar questions that have been generated may then be output, at step 434.

Figure 5:
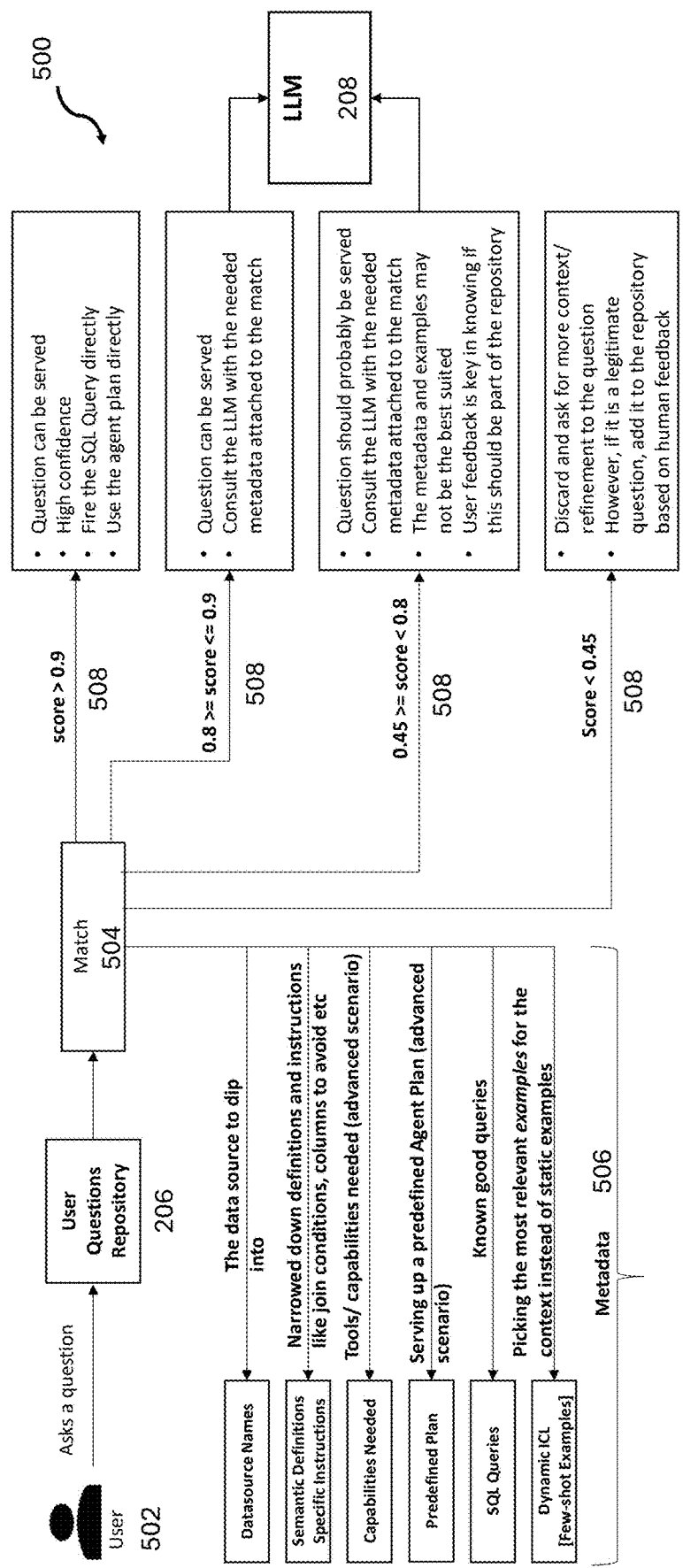
FIG. 5 is a simplified diagram for matching user questions to pre-generated questions in a UQR, which may be utilized for structured query generation according to some embodiments.

FIG. 5 is a simplified diagram 500 for matching user questions to pre-generated questions in a UQR, which may be utilized for structured query generation according to some embodiments. Diagram 500 shows a matching algorithm and/or operation that identifies pre-generated questions matching a user submitted question to a certain accuracy or threshold requirement such that a confidence in the accuracy of the matching may be used to retrieve metadata for structured query generation. As such, diagram 500 may be executed in the performance of structured query generation from natural language questions performed by data service platform 130 of call center system 110, discussed in reference to environment 100 of FIG. 1.

When a user question arrives in natural language from a user 502, the question may be checked against UQR 206 for matches. These matches may be used to generate an SQL query or other structured data query using LLM 208 and corresponding metadata. As such, UQR 206 may be used to process the question or other input from user 502 using a match process 504. Initially during match process 504, an embedding store may be searched for one or more matches that have similarity scores greater than a set threshold. Similarity scores may be determined by generating and/or obtaining embeddings from the input question (e.g., the natural language question from user 502) and the pre-generated question (e.g., questions from SQG 310 and IQG 314, where embeddings of such questions may be pre-computed and pre-generated prior to matching by match process 504). If a match is found, metadata 506 for the match may be retrieved, which allows for a flexible architecture that uses UQR 206 as a starting point to retrieve metadata 506 to be sent to LLM 208 with the input question for query generation. Metadata 506 may correspond to data used to enrich the question and provide additional content for LLM processing. Metadata 506 may include data sources, such as the specific data source to connect to when processing the incoming user question. Other metadata may include semantic definitions and specific instructions, which may reduce the number of schema definitions to be sent to LLM 208.

For example, there may be no need to send twenty individual tables to LLM 208 to process and respond to a single question, which can advantageously increase efficiencies in transmitting and processing. Using metadata 506, the definitions needed to serve the question may be determined, and any specific instructions on interpretation of columns, specific join conditions, etc., may also be determined and attached to the question for LLM 208. As such, metadata 506 may include a relevant data view definition for the pre-generated questions correlated with the natural language question, a relevant rule for the pre-generated questions, a relevant example of the pre-generated questions, a relevant data table of the pre-generated questions, a relevant data source name to connect to, or user-friendly explanations of columns of importance in the relevant data view definition or the relevant data table. Metadata 506 may also include the capabilities needed for LLM 208, such as libraries including LangChain and the like. These capabilities allow LLM 208 to decide the tools needed to complete the task (e.g., formulate a query for structured data from a question). These capabilities may be based on textual descriptions for those tools stored in the metadata store, which may be attached to questions in the embeddings store. For example, with a tool created to determine how to query an SQL server and return data, the tool may be described in plain text as part of metadata 506 for a set of questions and saved in the metadata store. Thereafter, UQR 206 may be used to determine and send the tool to LLM 208 for further query construction. Additionally, metadata for SQL queries and dynamic in-context learning may be used, such as examples of previous questions and generated queries. These may be static examples, however, specific and dynamic examples may be created for SQL or other types of query languages and/or formats.

Once a match is found, the embeddings (e.g., the question from user 502 and the pre-generated questions) may be compared to determine similarity scores. A score 508 may be determined from similarity scoring and/or analysis, which may be used to analyze an accuracy of the matching by match process 504 of user question embeddings to pre-generated question embeddings. Analysis of the match using score 508 may be based on the acceptable thresholds and/or ranges. For example, with 4 thresholds, the thresholds may include 0.9 and above, 0.8-0.9, 0.45-0.8, and below 0.45, although other values for thresholds may be used. If score 508 of the match is above 0.9, the match may be close enough that LLM 208 is not needed to craft an SQL or other structured data query and the query for the pre-generated question that was matched may be used. If between 0.8-0.9, the question may be served by the service provider's system based on the structured data, and the service provider may do so by using the metadata for the matched question(s) to instruct LLM 208 for query generation. If the match is between 0.45-0.8, the question should most likely be served and therefore the metadata may provide sufficient context for initial query construction and/or generation with the user submitted question. However, when below 0.45, further context for the question may be requested from the user to better perform matching. Thereafter, LLM 208 may be prompted using the question and corresponding identified metadata for the match, and a structured data query (e.g., an SQL query) may be generated by LLM 208. This query may then be used for structured data retrieval from a structured database system.

Figure 6:
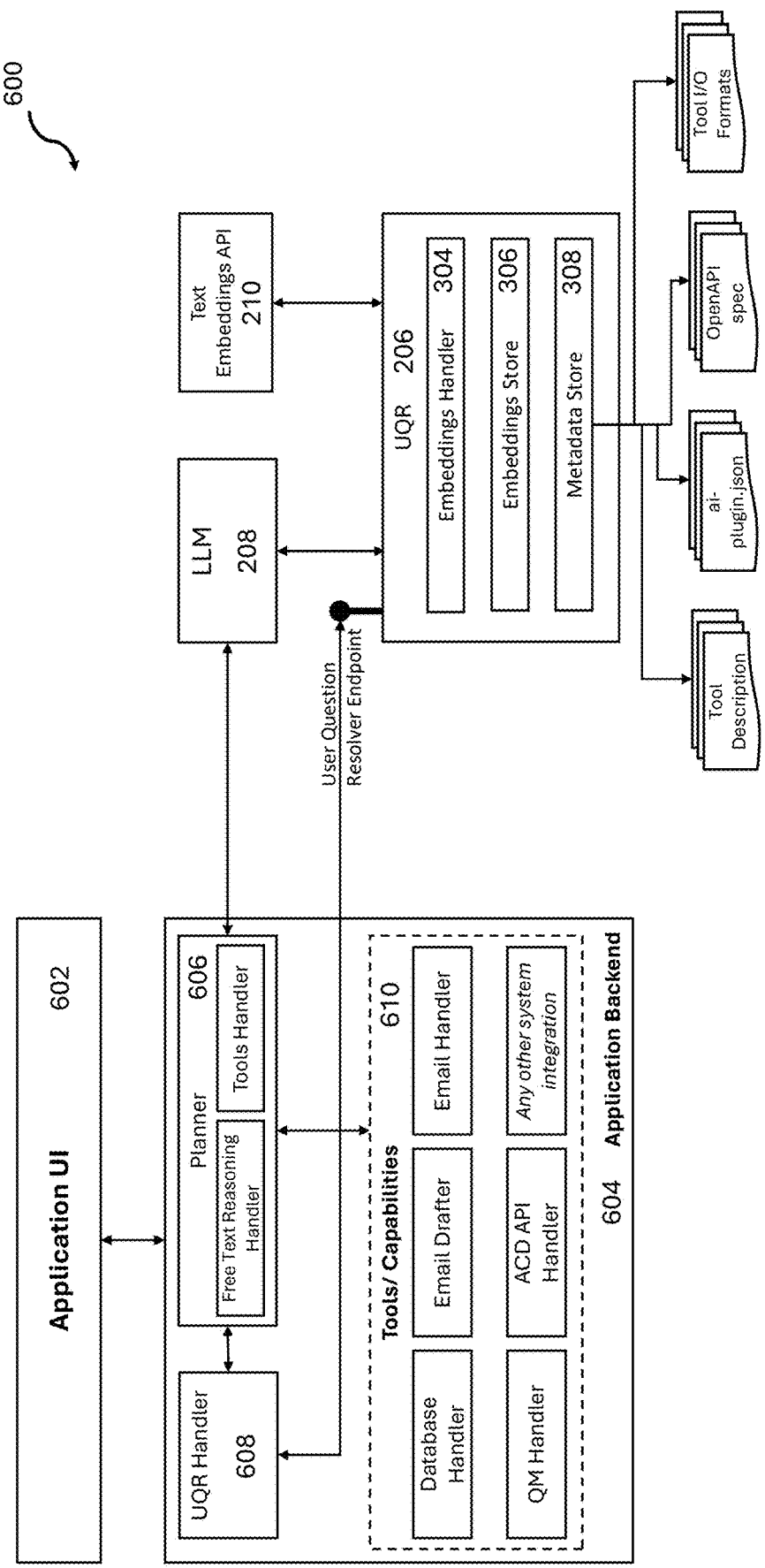
FIG. 6 is a simplified diagram of application components for responding to user questions with structured data according to some embodiments.

FIG. 6 is a simplified diagram of application components for responding to user questions with structured data according to some embodiments. In this regard, an application user interface (UI) 602 may correspond to a frontend component and interface to interact with users, where an application backend 604 may interact with UQR 206 for structured query generation from natural language questions. As such, application UI 602 and application backend 604 may be provided by one or more of frontend applications 122 from environment 100 of FIG. 1, where application UI 602 may allow users to utilize and interface with data service platform 130 of enterprise data system 120 in environment 100 through application backend 604, as discussed herein.

In diagram 600, application UI 602 may receive a user question in the form of natural language or other text different than a query language required by one or more structured databases. In the absence of UQR 206, application backend 604 may be required to directly communicate with LLM 208 for processing of natural language questions, where such processing may be inaccurate, time consuming, and processing cost/labor intensive to identify an appropriate query for accurate and useful structured data querying and retrieval. However, using UQR 206, a planner 606 and a UQR handler 608 may interact with tools/capabilities 610 to first contact UQR 206 to determine whether the user question can be served on a structured database using a structured query generated by prompting LLM 208. If so, UQR 206 returns the most relevant context or other metadata for the question to application backend 604 so the context may be sent to LLM 208 for query generation. As shown in diagram 500 of FIG. 5, if the matching threshold is very high (e.g., over a highest threshold), UQR 206 may provide such information and relevant structured query to UQR handler 608 so that planner 606 may interface with LLM 208 for query generation. However, when user questions are not found in UQR 206 (e.g., a very low matching score), human feedback may be utilized to vet and provide additional context to the incoming user question. An automated pipeline may generate variations of low scoring questions that are served on structured data, and use the variations to update UQR 206 using SQG 310 and/or IQG 314. In this manner, UQR 206 is kept relevant and updated. As such, UQR 206 may assist applications when translating natural language questions to SQL queries and the like. The results of the queries themselves can be varied depending on the persona asking the questions and the relational data at hand. Further, once the data has been displayed to the user as tables or charts, or in any appropriate form specified by the application using UQR 206, additional automated actions may be taken based on the results.

Figure 7:
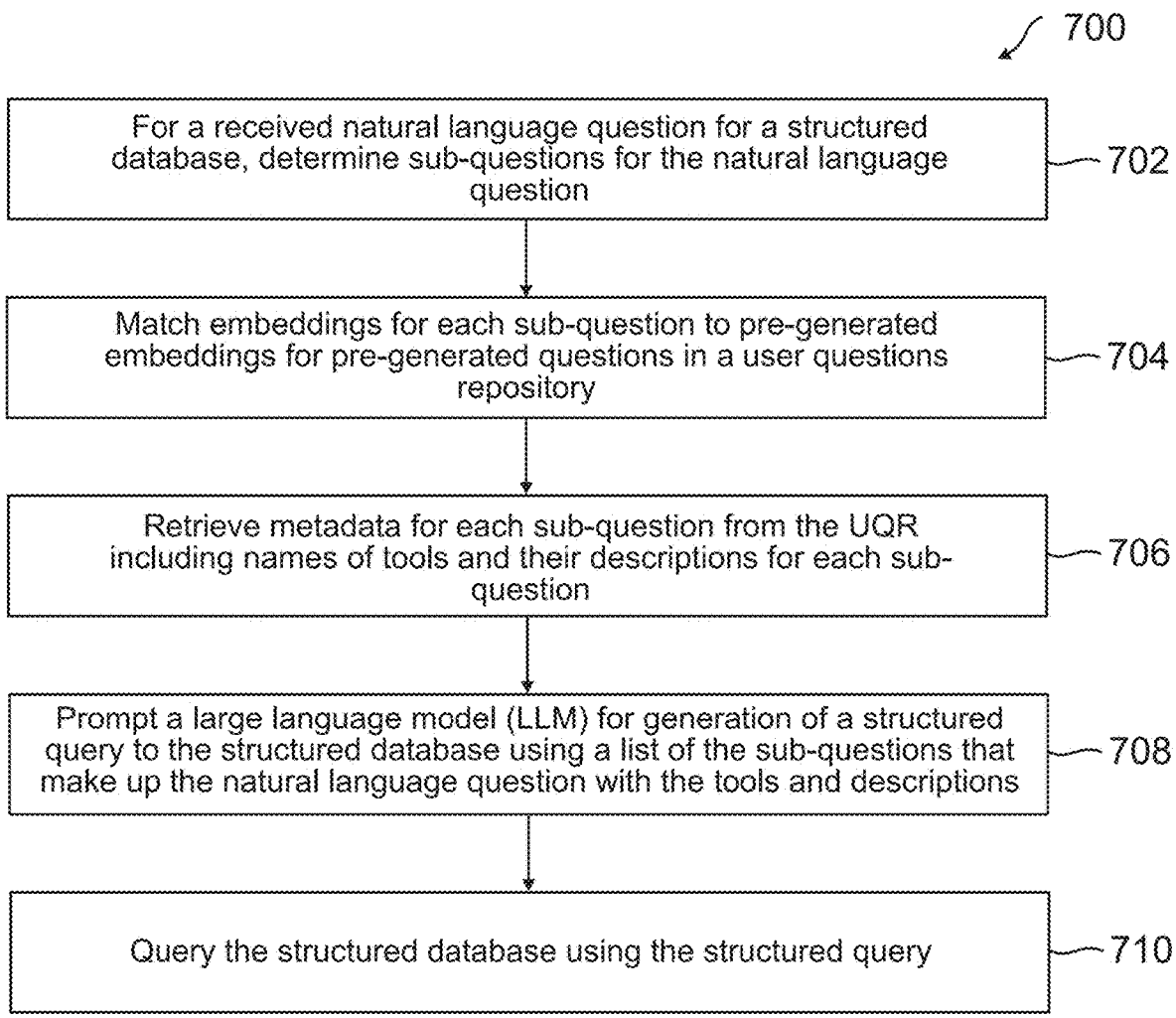
FIG. 7 is a simplified diagram of an exemplary flowchart for construction of a UQR for generating structured data queries from natural language questions using an LLM according to some embodiments.

FIG. 7 is a simplified diagram of an exemplary flowchart 700 for construction of a UQR for generating structured data queries from natural language questions using an LLM according to some embodiments. Note that one or more steps, processes, and methods described herein of flowchart 700 may be omitted, performed in a different sequence, or combined as desired or appropriate based on the guidance provided herein. Flowchart 700 of FIG. 7 includes operations executable by a data query system to perform data querying and searching of structured databases from natural language questions, as discussed in reference to FIG. 1-6. One or more of steps 702-710 of flowchart 700 may be implemented, at least in part, in the form of executable code stored on non-transitory, tangible, machine-readable media that when run by one or more processors may cause the one or more processors to perform one or more of steps 702-710. In some embodiments, flowchart 700 can be performed by one or more computing devices discussed in environment 100 of FIG. 1.

At step 702 of flowchart 700, for a received natural language question for a structured database, sub-questions for the natural language question are determined. A question may be received from a user for a structured database or other data storage system of structured data, where the question may be received in natural language in place of a structured query. As such, initially the question or other input may be broken down to determine all sub-questions that require processing and a response by the user in the submitted question. Each sub-question may therefore correspond to an independent structured query and corresponding structured data for retrieval, where the full question received may be answered based on responding to each sub-question. Parsing out the sub-questions may be done through natural language processing including syntax and semantic analysis, as well as conversion of the question or other input to embeddings for embedding comparison and analysis of sub-questions in the initial question.

At step 704 of flowchart 700, embeddings for each sub-question are matched to pre-generated embeddings for pre-generated questions in a UQR. An embedding store and/or handler may be used to generating embeddings from words, groups or phrases of words, characters, and the like in the question, where the embeddings may correspond to an embedded vector or other mathematical representation of the underlying words, which may be used to compare to other embeddings for matching. In this regard, an embeddings ML model or the like may be used to generate such embeddings, however, other algorithms for conversion of such words to the embedded vectors may also be used. Thereafter, the generated embeddings for the sub-question(s) may be compared to embeddings previously generated for pre-generated questions, such as those that may be generated procedurally from an SQG and/or IQG. This may allow for identification of closest matching pre-generated questions, including those that meet or exceed a threshold requirement for an accuracy of the matching.

At step 706 of flowchart 700, metadata for each sub-question is retrieved from the UQR including names of tools and their descriptions for each sub-question. After determining pre-generated embeddings and/or pre-generated questions matching the sub-question(s) with a sufficient measurement of accuracy (e.g., meeting or exceeding a threshold similarity comparison or metric), the corresponding metadata may be retrieved from a metadata store. The metadata may therefore designate the query parameters, data tables, views, ranges, and the like for performing structured searches of structured data from the structured database system. This allows for query parameters and other query generation requirements to be designated for creating a structured query of a structured database.

At step 708 of flowchart 700, an LLM is prompted for generation of a structured query to the structured database using a list of the sub-questions that make up the natural language question with the tools and descriptions. The LLM is prompted with one or more instructions to generate a structured data query in a query language, such as SQL, using the set of data provided with the prompt, as well as any knowledge base or corresponding training data for the LLM. In this regard, a prompt may be generated from the metadata, sub-question(s), and the like to request the LLM to utilize the language skills and knowledge for automated query generation. The tools and descriptions may correspond to those available for the query language and/or structured searching so that a query may be generated. The LLM may therefore provide intelligent generation of structured queries from such instructions and data based on the query language, syntax, tools, and the like of such language. The query may then be output to the user.

At step 710 of flowchart 700, the structured database is queried using the structured query. The structured query may allow for retrieval of structured data that was requested from the user's natural language question. As such, the data retrieval may provide data or a set of data that may be responsive to the question and may allow for an application to provide the response via a user interface. The response may be provided in natural language and/or conversational form, such as using a conversational AI and/or the LLM to converse back with the user in the natural language format. As such, the user may view a response to a question in natural language instead of being required to understand and parse through structured data queries and responses including data views and tables in formatted and structured form.

As discussed above and further emphasized here, FIGS. 1-7 are merely examples of enterprise data system 120 and corresponding methods for utilizing a UQR to process user questions on structured databases, which said examples should not be used to unduly limit the scope of the claims.

Figure 8:
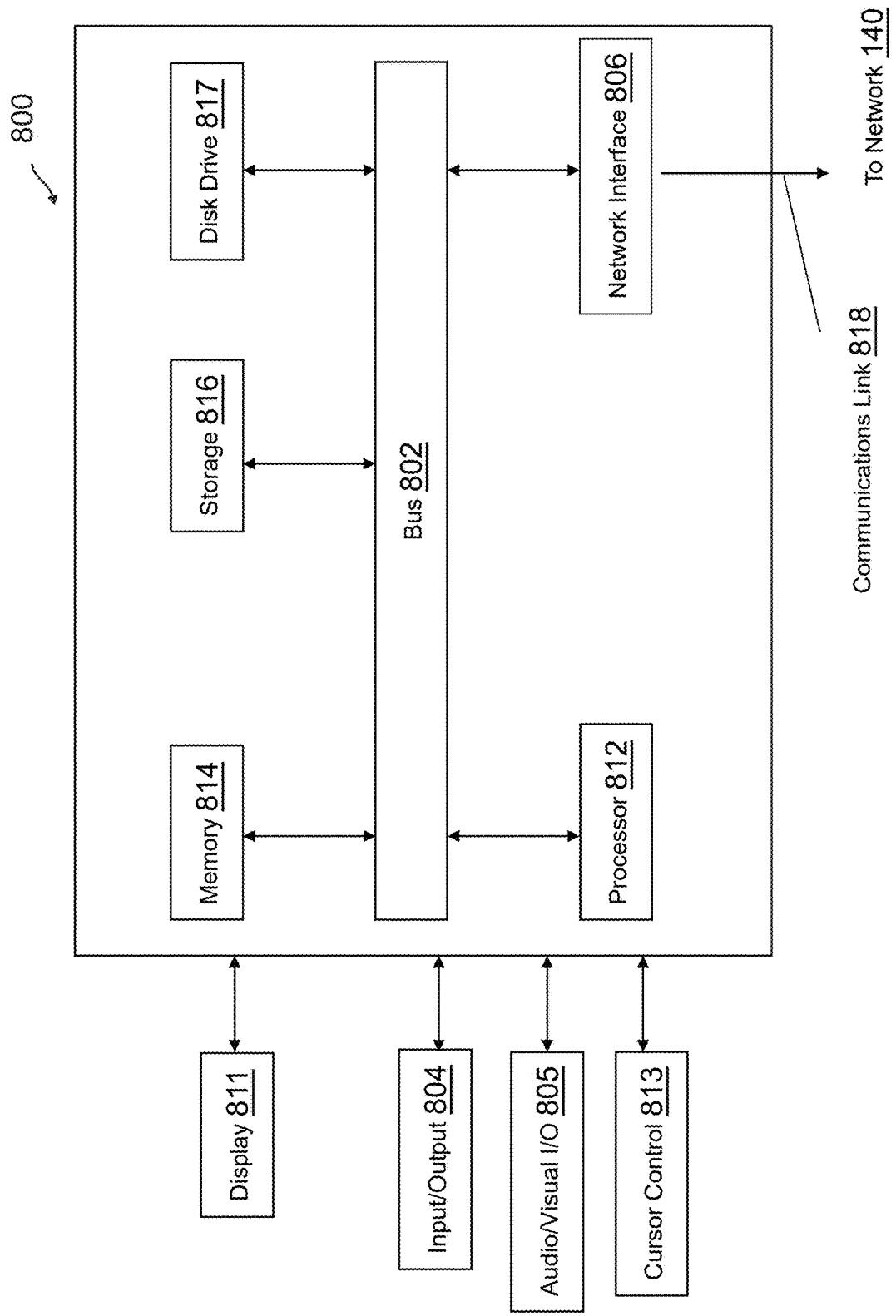
FIG. 8 is a simplified diagram of a computing device according to some embodiments.

FIG. 8 is a block diagram of a computer system 800 suitable for implementing one or more components in FIG. 1, according to an embodiment. In various embodiments, the communication device may include a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 800 in a manner as follows.

Computer system 800 includes a bus 802 or other communication mechanism for communicating information data, signals, and information between various components of computer system 800. Components include an input/output (I/O) component 804 that processes a user action, such as selecting keys from a keypad/keyboard, selecting one or more buttons, image, or links, and/or moving one or more images, etc., and sends a corresponding signal to bus 802. I/O component 804 may also include an output component, such as a display 811 and a cursor control 813 (such as a keyboard, keypad, mouse, etc.). An optional audio/visual input/output component 805 may also be included to allow a user to use voice for inputting information by converting audio signals. Audio/visual I/O component 805 may allow the user to hear audio, and well as input and/or output video. A transceiver or network interface 806 transmits and receives signals between computer system 800 and other devices, such as another communication device, service device, or a service provider server via network 140. In one embodiment, the transmission is wireless, although other transmission mediums and methods may also be suitable. One or more processors 812, which can be a micro-controller, digital signal processor (DSP), or other processing component, processes these various signals, such as for display on computer system 800 or transmission to other devices via a communication link 818. Processor(s) 812 may also control transmission of information, such as cookies or IP addresses, to other devices.

Components of computer system 800 also include a system memory component 814 (e.g., RAM), a static storage component 816 (e.g., ROM), and/or a disk drive 817. Computer system 800 performs specific operations by processor(s) 812 and other components by executing one or more sequences of instructions contained in system memory component 814. Logic may be encoded in a computer readable medium, which may refer to any medium that participates in providing instructions to processor(s) 812 for execution. Such a medium may take many forms, including but not limited to, non-volatile media, volatile media, and transmission media. In various embodiments, non-volatile media includes optical or magnetic disks, volatile media includes dynamic memory, such as system memory component 814, and transmission media includes coaxial cables, copper wire, and fiber optics, including wires that include bus 802. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 800. In various other embodiments of the present disclosure, a plurality of computer systems 800 coupled by communication link 818 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A data query system configured to intelligently generate structured data queries from natural language questions using large language models (LLMs), the data query system comprising:

a processor and a non-transitory computer readable medium operably coupled thereto, the computer readable medium comprising a plurality of instructions stored in association therewith that are accessible to, and executable by, the processor, to perform query generation operations which comprise:

receiving a first natural language question for a response to be provided based on structured data in a structured database system;

converting one or more words in the first natural language question to one or more first embeddings;

matching the one or more first embeddings to one or more pre-generated embeddings for pre-generated questions from a user questions repository (UQR), wherein the matching includes computing similarity scores between the one or more first embeddings and the one or more pre-generated embeddings using a similarity scoring operation that assess an accuracy of the matching;

determining that one or more of the similarity scores associated with the accuracy of the matching meets or exceeds a first threshold similarity;

determining, using an LLM and metadata corresponding to the pre-generated questions from the UQR, a structured data query for querying the structured database system for the structured data based on the similarity score;

querying the structured database system for the response to the first natural language question, wherein the response includes at least a portion of the structured data; and outputting, in a user interface of an application associated with the UQR, the response to the first natural language question from the LLM.

2. The data query system of claim 1, wherein, before the receiving the first natural language question, the query generation operations further comprise:

determining a given prompt question for the UQR;

generating a set of similar questions using the LLM and the given prompt question;

determining similar question embeddings for each question in the set of similar questions; and storing the set of similar questions and the individual embedding for each question in the similar question embeddings in the UQR, wherein the pre-generated questions include the set of similar questions.

3. The data query system of claim 1, wherein, before the receiving the first natural language question, the query generation operations further comprise:

determining a set of schema definitions for one or more data views, one or more data tables, or both;

generating a set of questions of relevance to the set of schema definitions using the LLM and the set of schema definitions;

determining question of relevance embeddings for each question in the set of questions of relevance; and storing the set of questions of relevance and the individual embedding for each question in the question of relevance embeddings in the UQR, wherein the pre-generated questions include the set of questions of relevance.

4. The data query system of claim 1, wherein the first threshold similarity comprises a highest threshold of a plurality of threshold similarities, wherein determining the structured data query comprises retrieving the structured data query based on the one or more pre-generated embeddings, and wherein the structured data query was previously generated by the LLM and/or corrected or updated or even completely hand-crafted by a human and known to be an accurate structured data query for a corresponding one of the pre-generated questions.

5. The data query system of claim 1, wherein the first threshold similarity comprises a middle threshold of a plurality of threshold similarities between a highest one of the plurality of threshold similarities and a lowest one of the plurality of threshold similarities, and wherein determining the structured data query comprises generating the structured data query using the LLM by prompting the LLM using the first natural language question and the metadata for one of the pre-generated questions corresponding to the one or more pre-generated embeddings matched to the one or more first embeddings of the first natural language question.

6. The data query system of claim 5, wherein the generating the structured data query comprises:

creating an LLM prompt for the LLM based on the first natural language question, the metadata, and a prompting strategy associated with the LLM and generating the structured data query;

prompting the LLM to generate the structured data query using the LLM prompt; and receiving at least the structured data query from the LLM based on the prompting.

7. The data query system of claim 1, wherein the query generation operations further comprise:

determining one or more second embeddings for a second natural language question are at or falls below a minimum threshold of a plurality of threshold similarities; and requesting additional context for the second natural language question.

8. The data query system of claim 1, wherein the metadata comprises at least one of a relevant data view definition for one of the pre-generated questions correlated with the first natural language question based on the matching, a relevant rule for the one of the pre-generated questions, a relevant example for the one of the pre-generated questions, a relevant data table for the one of the pre-generated questions, a relevant data source name to connect to, or user-friendly explanations of columns of importance determined by a user in the relevant data view definition or the relevant data table.

9. A method to intelligently generate structured data queries from natural language questions using large language models (LLMs) for a data query system, the method comprising:

receiving a first natural language question for a response to be provided based on structured data in a structured database system;

converting one or more words in the first natural language question to one or more first embeddings;

matching the one or more first embeddings to one or more pre-generated embeddings for pre-generated questions from a user questions repository (UQR), wherein the matching includes computing similarity scores between the one or more first embeddings and the one or more pre-generated embeddings using a similarity scoring operation that assess an accuracy of the matching;

determining that one or more of the similarity scores associated with the accuracy of the matching meets or exceeds a first threshold similarity;

determining, using an LLM and metadata corresponding to the pre-generated questions from the UQR, a structured data query for querying the structured database system for the structured data based on the similarity score;

querying the structured database system for the response to the first natural language question, wherein the response includes at least a portion of the structured data; and outputting, in a user interface of an application associated with the UQR, the response to the first natural language question from the LLM.

10. The method of claim 9, wherein, before the receiving the first natural language question, the method further comprises:

determining a given prompt question for the UQR;
generating a set of similar questions using the LLM and the given prompt question;
determining similar question embeddings for each question in the set of similar questions; and
storing the set of similar questions and the individual embedding for each question in the similar question embeddings in the UQR, wherein the pre-generated questions include the set of similar questions.

11. The method of claim 9, wherein, before the receiving the first natural language question, the method further comprises:
determining a set of schema definitions for one or more data views, one or more data tables, or both;
generating a set of questions of relevance to the set of schema definitions using the LLM and the set of schema definitions;
determining question of relevance embeddings for each question in the set of questions of relevance; and
storing the set of questions of relevance and the individual embedding for each question in the question of relevance embeddings in the UQR, wherein the pre-generated questions include the set of questions of relevance.

12. The method of claim 9, wherein the first threshold similarity comprises a highest threshold of a plurality of threshold similarities, wherein determining the structured data query comprises retrieving the structured data query based on the one or more pre-generated embeddings, and wherein the structured data query was previously generated by the LLM and/or corrected or updated or even completely hand-crafted by a human and known to be an accurate structured data query for a corresponding one of the pre-generated questions.

13. The method of claim 9, wherein the first threshold similarity comprises a middle threshold of a plurality of threshold similarities between a highest one of the plurality of threshold similarities and a lowest one of the plurality of threshold similarities, and wherein determining the structured data query comprises generating the structured data query using the LLM by prompting the LLM using the first natural language question and the metadata for one of the pre-generated questions corresponding to the one or more pre-generated embeddings matched to the one or more first embeddings of the first natural language question.

14. The method of claim 13, wherein the generating the structured data query comprises:
creating an LLM prompt for the LLM based on the first natural language question, the metadata, and a prompting strategy associated with the LLM and generating the structured data query;
prompting the LLM to generate the structured data query using the LLM prompt; and
receiving at least the structured data query from the LLM based on the prompting.

15. The method of claim 9, further comprising:
determining one or more second embeddings for a second natural language question are at or falls below a minimum threshold of a plurality of threshold similarities; and
requesting additional context for the second natural language question.

16. The method of claim 9, wherein the metadata comprises at least one of a relevant data view definition for one of the pre-generated questions correlated with the first natural language question based on the matching, a relevant rule for the one of the pre-generated questions, a relevant example for the one of the pre-generated questions, a relevant data table for the one of the pre-generated questions, a relevant data source name to connect to, or user-friendly explanations of columns of importance determined by a user in the relevant data view definition or the relevant data table.

17. A non-transitory computer-readable medium having stored thereon computer-readable instructions executable to intelligently generate structured data queries from natural language questions using large language models (LLMs) for a data query system, the computer-readable instructions executable to perform query generation operations which comprise:
receiving a first natural language question for a response to be provided based on structured data in a structured database system;
converting one or more words in the first natural language question to one or more first embeddings;
matching the one or more first embeddings to one or more pre-generated embeddings for pre-generated questions from a user questions repository (UQR), wherein the matching includes computing similarity scores between the one or more first embeddings and the one or more pre-generated embeddings using a similarity scoring operation that assess an accuracy of the matching;
determining that one or more of the similarity scores associated with the accuracy of the matching meets or exceeds a first threshold similarity;
determining, using an LLM and metadata corresponding to the pre-generated questions from the UQR, a structured data query for querying the structured database system for the structured data based on the similarity score;
querying the structured database system for the response to the first natural language question, wherein the response includes at least a portion of the structured data; and
outputting, in a user interface of an application associated with the UQR, the response to the first natural language question from the LLM.

18. The non-transitory computer-readable medium of claim 17, wherein, before the receiving the first natural language question, the query generation operations further comprise:
determining a given prompt question for the UQR;
generating a set of similar questions using the LLM and the given prompt question;
determining similar question embeddings for each question in the set of similar questions; and
storing the set of similar questions and the individual embedding for each question in the similar question embeddings in the UQR, wherein the pre-generated questions include the set of similar questions.

19. The non-transitory computer-readable medium of claim 17, wherein, before the receiving the first natural language question, the query generation operations further comprise:
determining a set of schema definitions for one or more data views, one or more data tables, or both;
generating a set of questions of relevance to the set of schema definitions using the LLM and the set of schema definitions;
determining question of relevance embeddings for each question in the set of questions of relevance; and
storing the set of questions of relevance and the individual embedding for each question in the question of relevance embeddings in the UQR, wherein the pre-generated questions include the set of questions of relevance.

20. The non-transitory computer-readable medium of claim 17, wherein the first threshold similarity comprises a highest threshold of a plurality of threshold similarities, wherein determining the structured data query comprises retrieving the structured data query based on the one or more pre-generated embeddings, and wherein the structured data query was previously generated by the LLM and/or corrected or updated or even completely hand-crafted by a human and known to be an accurate structured data query for a corresponding one of the pre-generated questions.

* * * * *